United States Patent
Blaauw

[11] 3,760,517
[45] Sept. 25, 1973

[54] SPRING FORMED WORM GEAR FOR SNOW BLOWER SPOUT DRIVE

[75] Inventor: Andrew Blaauw, Winneconne, Wis.

[73] Assignee: J. I. Case Company, Racine, Wis.

[22] Filed: May 21, 1970

[21] Appl. No.: 39,376

[52] U.S. Cl. ............................... 37/43 R, 74/458
[51] Int. Cl. ............................................ E01h 5/09
[58] Field of Search ................... 37/43; 242/46.8; 74/425, 462, 458, 426, 427; 302/61, 60, 59

[56] References Cited
UNITED STATES PATENTS

| | | | |
|---|---|---|---|
| 3,580,351 | 5/1971 | Mollen | 37/43 E |
| 511,269 | 12/1893 | Holmes | 74/458 X |
| 1,436,072 | 11/1922 | Allis | 74/458 X |
| 3,049,936 | 8/1962 | Schnell | 74/458 |
| 3,075,813 | 1/1963 | Vohl | 302/61 |
| 3,318,027 | 5/1967 | McNeal | 37/43 R |
| 3,572,153 | 3/1971 | Dove | 74/458 X |
| 3,174,354 | 3/1965 | Kuehnle | 74/424.5 |
| 3,369,420 | 2/1968 | Spyra | 74/462 X |

FOREIGN PATENTS OR APPLICATIONS

| | | | |
|---|---|---|---|
| 823,224 | 12/1951 | Germany | 74/458 |
| 74,552 | 5/1959 | Netherlands | 74/458 |
| 634,558 | 1/1962 | Canada | 37/43 |
| 800,113 | 8/1958 | Great Britain | 37/43 |

OTHER PUBLICATIONS
Product Engineering, May, 1953, "Worms and Ratchets" by Haim Murro Primary Examiner—Robert E. Pulfrey
Assistant Examiner—R. E. Suter
Attorney—Cullen, Settle, Sloman and Cantor

[57] ABSTRACT

A snow caster chute rotating mechanism includes a wire form worm screw which is supported on a wire rod shaft which in turn is retained at each end of the worm within spaced support bearings; the wire form screw is adapted to threadedly engage spaced notches provided circumferentially around a flange of the rotating chute so that, upon rotation of the wire form worm screw by means of a crank or handle connected to the wire rod shaft, the rotating chute can be turned to any desired angularly adjusted snow-throwing position; the wire form screw comprises a helically coiled spring wound around a wire rod shaft and having both of its ends attached thereto and its coils spaced a distance corresponding to the spacing of the notches around the flange of the rotating chute; the coil spring worm screw is of a larger cylindrical inner diameter than the wire rod shaft to provide sufficient resiliency as a spring in order to store potential energy in case the mechanism becomes jammed and to be self-cleaning so as to prevent the accummulation of rust or ice between helical threads of the coil spring worm screw.

3 Claims, 3 Drawing Figures

PATENTED SEP 25 1973　　　　　　　　　　　　　　3,760,517
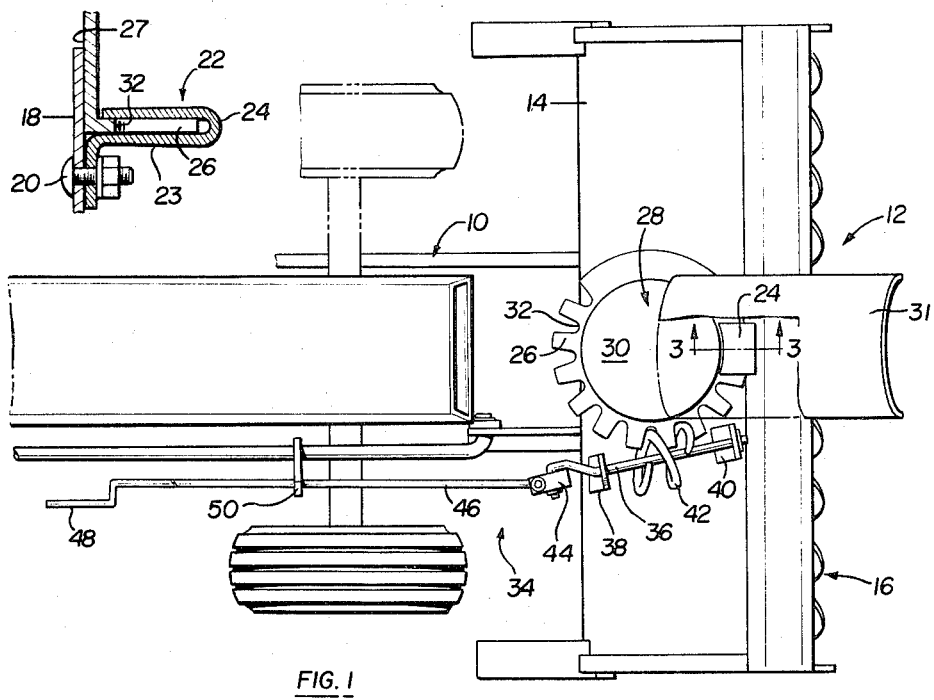
FIG. 3
FIG. 1
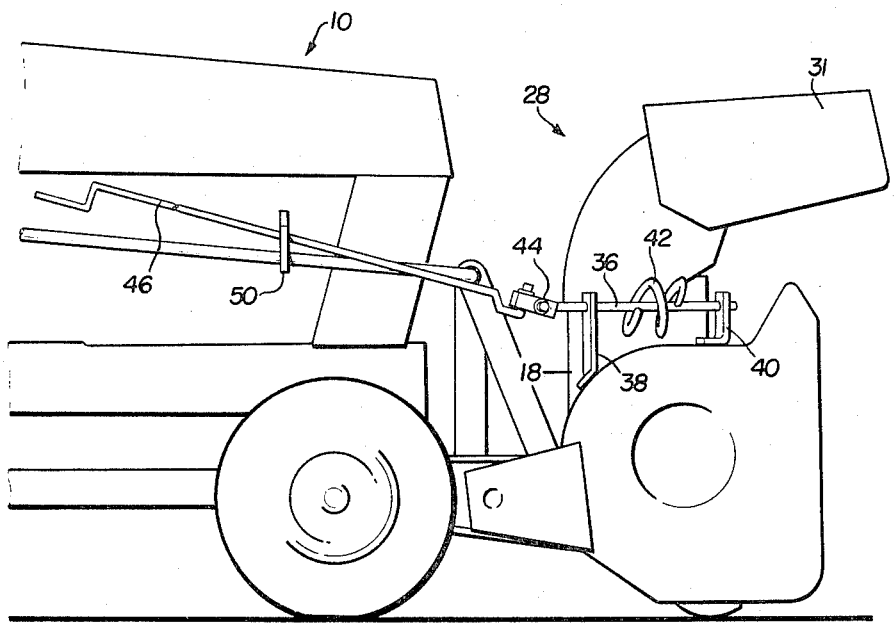
FIG. 2
INVENTOR.
ANDREW C. BLAAUW.
BY:
CULLEN, SETTLE, SLOMAN & CANTOR
ATT'YS.

SPRING FORMED WORM GEAR FOR SNOW BLOWER SPOUT DRIVE

BACKGROUND OF THE INVENTION

The present invention relates in general to a gearing arrangement for implements and more in particular to a low power, slow moving gearing arrangement for an auxiliary rotating part of the implement.

In driving arrangements for an auxiliary part of an implement, the worm gear is mounted on or integral with the auxiliary part and is driven by a worm having teeth mating with the teeth of the worm gear. The worm is rotated either manually or by power driven means.

Attempts have been made to manufacture an inexpensive worm gearing for low power auxiliary drive mechanisms in which the shaft worm is formed by means of a helical wire wound around the shaft in the form of a coil spring.

In one known example, the worm was formed by mounting a helical spring on a smooth shaft and fixing the spring ends to the shaft by means of notched stop collars which are secured to the shaft to prevent helical or rotational movement of the coils around the shaft during operation. The cylindrical inner diameter of the helical spring which forms the shaft worm in the known device substantially corresponds to the external diameter of the drive shaft causing the accumulation of dirt, snow, ice, etc. between the coils which eventually wear down the abutting interfaces between the internal diameter of the spring coils and the shaft due to the relative sliding movement of the coils along the shaft during operation of the gearing. Thus, this arrangement requires frequent service and cleaning of the mechanism in order to prevent an early breakdown.

In another known device of this kind the helical spring forming the shaft worm is retained against axial sliding movement within a helical groove provided around the drive shaft so that a part of the internal surfaces of the coils are recessed within the groove to prevent relative motion axially of the shaft. Obviously, this arrangement, likewise, accummulates dirt and rust if not serviced and cleaned frequently.

In addition, the known devices do not provide sufficient resiliency in the drive mechanism in order to retain the driven auxiliary part in position or to compensate for misalignment of the driven auxiliary part and its associated worm gear relative to the shaft worm.

Furthermore, since in all of these known devices the coils of the helical spring shaft worm are relatively fixed against axial movement relative to the shaft either by friction between the drive shaft and coils or by a retaining groove — they are not capable of resilient deflection to store energy during operation. In the present invention, the center portion of the spring is spaced from and freely supported on the rod, permitting the spring to deflect on the rod, but is fixed at its opposite ends to the rod, such that the spring will be preloaded, if jamming occurs, with sufficient stored energy to overcome the jamming of the mechanism due to the accummulation of ice or dirt between the coils.

SUMMARY OF THE INVENTION

The primary object of the invention is to provide a worm for a worm gear drive mechanism utilizing a helical coil spring as a shaft worm driving element coacting with a driven worm gear attached to or integral with the auxiliary part to be driven.

The ends of the helical coil spring which forms the shaft worm are fixed to the shaft and the inner diameter of the coil spring is larger than the external diameter of the shaft so as to permit the coils to freely deflect during the driving operation providing a self-cleaning effect to remove rust, ice or dirt from the mechanism. Further, the large coil spring is capable of storing an amount of potential energy and acts as an unloading spring in case the mechanism becomes jammed due to misalignment of the parts or accummulation of dirt, ice or snow in the mechanism.

The present invention will be best understood by reference to the following detailed description in connection with the accompanying drawings schematically illustrating a preferred embodiment thereof.

BRIEF DESCRIPTION OF THE DRAWINGS

In the attached drawings

FIG. 1 is a top plan view of a tractor having a snow caster attached to its front end including a snow chute adapted to be rotatably driven by the present novel worm and worm gear drive arrangement;

FIG. 2 is a side view of the illustration in FIG. 1, and

FIG. 3 is a cross-section of the worm gear flange and supporting means of the snow chute as seen along 3—3 in FIG. 1.

DESCRIPTION OF THE PREFERRED EMBODIMENT

With reference to FIG. 1, there is shown a tractor vehicle 10, shown here as of the small garden-type, which has attached thereto at its front end a snow caster implement 12 adapted to be pushed by the tractor 10 for snow removal.

It should be mentioned here that the type of vehicle adapted to push the snow caster implement 12 is of no importance or can even be dispensed with entirely in which case the snow caster implement 12 would be pushed by hand.

The snow caster implement 12 as seen in FIG. 1 and more particularly in FIG. 2, comprises an elongated housing 14 in which is rotatably supported a snow auger 16 which is adapted to move snow in a helical path towards the center of the housing 14 for continuous disposal through a funnel 18 located on top in the center of the housing 14. The helical auger blade 16 is normally rotated by movement of the snow caster implement 12 as in commercially available devices and forms no part of this invention.

The funnel 18, which may be of tubular cylindrical shape, is securely attached to the housing 14 and has an open end around which are secured by means of fasteners 20 a plurality of support brackets 22. Each of the brackets 22 has an outwardly extending U-shaped body formation comprising a lower flange 23 and reversely bent upper flange 24. Brackets 22, in assembly, are aligned relative to the funnel 18 in substantially coplanar relationship to form a guide and support for a drive flange 26 of the rotatable snow chute 28.

With particular reference to FIG. 3, it will be noted that the support ring 27 of the snow chute 28 which contains the driving flange 26 has an internal diameter substantially corresponding to the external diameter of the funnel 18 so that, in assembly, the ring 27 of the snow chute fits circumferentially around the upper edge of the funnel 18 which the circumferential flange portion 26 radially extending therefrom. Thereafter the brackets 22 are attached by means of fasteners 20 spaced equally circumferentially around the funnel 18 such that the upper flange 24 overlies the upper surface of the flange 26 of the snow chute whereas the lower surface of the flange 26 is supported on the lower flange 23 of the brackets 22 as seen in FIG. 3. Thus, the opposed flanges 23 and 24 of the support brackets 22 receive the flange 26 of the funnel 18 therebetween and form a guide for rotational movement of the funnel.

Attached or integral with the ring 27 of the snow chute 28 is a toroidal shaped skirt 30 which may be provided with an adjustable extension 31 adapted to throw the snow transferred by the rotating auger 16 through the funnel 18 outwardly and clear of the snow caster implement.

With particular reference to FIGS. 1 and 2, the support flange 26 of the snow chute 28 is provided with a plurality of equally circumferentially spaced notches 32 extending radially inwardly toward the ring 27. These circumferentially spaced notches 32 in the flange 26 are adapted, in assembly, to be in mesh with the worm of a drive shaft worm assembly generally indicated at 34.

The drive shaft worm assembly 34 consists essentially of a shaft or rod 36 extending in tangential direction to the flange 26 of the snow chute 28 and which is supported for rotation within spaced brackets 38 and 40 secured to the top of the snow caster housing 14. The rod support brackets 38 and 40 are aligned and spaced such as to provide sufficient room for a drive worm 42 supported for rotation on the rod 36 and which is adapted to mesh with the notches 32 in the flange 26 of the snow chute 28 between a pair of the spaced guide support brackets 22.

The drive worm 42 is composed of a length of helically coiled spring wire wound around the drive rod 36 having both its ends secured thereto by any preferred means so as to be rotatable with the rod 36. The coils of the helical coil drive worm 42 are predeterminedly spaced so as to correspond to the spacing between adjacent notches 32 in the flange 26 of the snow chute 28 to properly mesh therewith.

Thus, upon rotation of the rod 36 by means to be described hereafter, the helical drive worm 42 will be rotated accordingly between the rod support brackets 38 and 40 to thereby mesh with the teeth formed by adjacent notches 32 on the flange 26 of the snow chute. This causes rotation of the snow chute 28 towards the left or the right of the snow caster housing 14 depending on the direction of rotation of the drive rod 36 in order to throw the snow clear of the snow caster housing 14.

It will be noted, particularly from FIGS. 1 and 2, that the helical coil drive worm 42 has a substantially greater cylindrical inner diameter than the diameter of the centrally disposed drive rod 36. By this arrangement, the coils of the helical drive worm 42 are permitted to flex radially and axially relative to the drive rod 36. Thus, the freely supported coils of the helical drive worm 42 compensate automatically for any misalignment or out of round condition of the flange 26 of the snow chute without sacrificing its driving characteristic due to its radial and axial flexibility relative to the substantially rigid drive rod 36. This characteristic of the helical drive worm 42 has a self-cleaning effect and, due to the continuous flexing of the coils, snow, ice, dirt or any other accummulation between the drive worm 42 and the notched flange 26 will be continuously shaken off. Additionally, this arrangement substantially eliminates wear between the helical drive worm spring 42 and the drive rod 36 because the spring is not normally in contact with the rod.

In order to rotate the drive rod 36 in the desired direction, the drive rod 36 is attached to one side of a universal joint 44 which other side is attached to the end of an actuating rod 46 having a handle or crank 48 at its extreme end to permit rotation of the actuating rod 46 which is transferred through the universal joint 44 to the drive rod 36.

The disclosed embodiment of the universal joint 44 is universal in two planes to allow tilting of the blower.

The universal joint 44 permits universal displacement of the snow caster assembly 12 without interference in the operation of the rotating device for the snow chute 28.

As seen in FIGS. 1 and 2, the actuating rod 46 is longitudinally supported along the side of the tractor 10 by means of a bracket 50 and extends upwardly and rearwardly to the drivers seat of the tractor adjacent which the actuating rod 46 culminates into a handle 48 for easy manipulation by the operator of the tractor.

It is evident from the foregoing description that upon manipulation of the handle or crank 48 the drive rod 36 will be rotated through the universal joint 44 to thereby rotate the coil spring drive worm 42 which in turn rotatably advances the snow chute 28 by means of meshing engagement of the coils within the notches 32 on the flange 26.

It will be apparent from the foregoing description that an inexpensive rotating mechanism for an auxiliary device on an implement has been provided. The present novel coil spring worm drive is highly wear resistant because the coils are spaced from the shaft and the mechanism is self-cleaning due to the flexibility of the coils of the drive worm which are loosely supported around the drive rod. This arrangement also provides for compensation of misalignment in the assembly without affecting in any way the transmission of rotatable driving power.

Although the invention has been described in connection with one particular embodiment thereof it will be understood that it is capable of modifications and variations in structure without departing from the spirit and essential characteristic thereof, therefore, the present embodiment is to be considered in all respects as illustrative only and not restrictive, the scope of the invention being indicated by the appended claims rather than by the foregoing description.

What is claimed is:

1. A drive mecahnism for a rotatable snow blower implement subject to jamming and accumulation and freezing of snow and other foreign material during use, the blower implement having a tubular funnel receiving the material handled by the blower implement, a circular flange circumferentially disposed around said funnel adjacent one end and having a plurality of angularly spaced radial notches, and a worm gear means in meshing engagement with the notches in said flange and adapted to intermittently rotate the funnel in either direction upon rotation of said worm gear means, the improvement in said worm gear means comprising means, for reducing the accumulation and freezing of snow and other foreign material on said worm gear means and for removing any snow and other foreign material which accumulates or freezes on said worm gear means, said reducing and removing means including an elongated shaft supported for rotational movement about its axis adjacent said notched flange generally parallel to a tangent of said circular flange and a helical spring surrounding said shaft, said helical spring fixed to said shaft at the ends of said spring and having a central portion freely supported on and spaced from said shaft between said fixed locations, said central portion of the spring having a plurality of coils normally spaced to correspond to the angular spacing of the notches in said flange and in meshing engagement with said notches, said freely supported central portion of the spring having an internal radius exceeding the diameter of said shaft so that said spring is spaced away from the external diameter of said shaft for providing a clearance between said shaft and the coils through which other foreign material may pass without accumulating or freezing on said worm gear means, said internal spring diameter and spacing of said central portion further providing upon rotation of said shaft and spring, an axial and radial flexing of the spring relative to the shaft while maintaining said meshing engagement for freeing said spring from any snow or foreign material which may accumulate and freeze on said worm gear means.

2. The drive mechanism defined in claim 1, characterized in that said worm gear means includes a drive means adapted to rotate said shaft for rotation of said funnel and a universal joint between said drive means and said shaft permitting rotational movement of said funnel in either direction about its axis.

3. The drive means defined in claim 1, characterized in that said funnel is supported for rotation about its axis by a U-shaped bracket secured at one end to said implement and receiving said circular flange for rotational movement.

\* \* \* \* \*